US007452519B2

(12) United States Patent
Khabashesku et al.

(10) Patent No.: US 7,452,519 B2
(45) Date of Patent: *Nov. 18, 2008

(54) SIDEWALL FUNCTIONALIZATION OF SINGLE-WALL CARBON NANOTUBES THROUGH C-N BOND FORMING SUBSTITUTIONS OF FLUORONANOTUBES

(75) Inventors: Valery N. Khabashesku, Houston, TX (US); John L. Margrave, deceased, late of Bellaire TX (US); by Mary Lou Margrave, legal representative, Bellaire, TX (US); Joel L. Stevens, Houston, TX (US); Gaelle Armelle Derrien, Montpellier (FR)

(73) Assignee: William Marsh Rice University, Houston, TX (US)

( * ) Notice: Subject to any disclaimer, the term of this patent is extended or adjusted under 35 U.S.C. 154(b) by 732 days.

This patent is subject to a terminal disclaimer.

(21) Appl. No.: 10/714,187

(22) Filed: Nov. 14, 2003

(65) Prior Publication Data

US 2006/0171874 A1 Aug. 3, 2006

Related U.S. Application Data

(60) Provisional application No. 60/427,102, filed on Nov. 18, 2002.

(51) Int. Cl.
*D01F 9/12* (2006.01)
(52) U.S. Cl. .................. 423/447.2; 423/447.1; 977/748; 977/847
(58) Field of Classification Search .............. 423/447.1, 423/447.2; 977/748, 847
See application file for complete search history.

(56) References Cited

U.S. PATENT DOCUMENTS

| | | | | |
|---|---|---|---|---|
| 6,827,918 | B2 * | 12/2004 | Margrave et al. | 423/447.1 |
| 6,841,139 | B2 * | 1/2005 | Margrave et al. | 423/447.1 |
| 6,875,412 | B2 * | 4/2005 | Margrave et al. | 423/447.2 |
| 7,029,646 | B2 * | 4/2006 | Margrave et al. | 423/447.1 |

OTHER PUBLICATIONS

Ijima, et al., "Single-shell carbon nanotubes of 1-nm diameter", 363 Nature (1993), pp. 603-605.
Wong, et al., "Carbon Nanotube Tips: High-Resolution Probes for Imaging Biological Systems", 120 J. Am. Chem. Soc. (1998), pp. 603-604.
Yu, et al., "Tensile Loading of Ropes of Single Wall Carbon Nanotubes and Their Mechanical Properties", 84 Phys. Rev. Lett. (2000), pp. 5552-5555.
Baughman, et al., "Carbon Nanotubes—the Route Toward Applications", 297 Science (2002), pp. 787-792.
Odom, et al., "Structure and Electronic Properties of Carbon Nanotubes", 104 J. Phys. Chem. (2000), pp. 2794-2809.
Kong, et al., "Nanotube Molecular Wires as Chemical Sensors", 287 Science (1998), pp. 622-625.
Rao, et al., "Nanotubes", 2 Chem Phys. Chem. (2001) , pp. 78-105.
Gao, et al., "Fabrication and Electron Field Emission Properties of Carbon Nanotubes Films . . . ", 13 Adv. Mater. (2001), pp. 1770-1773.
Calvert, "A Recipe for Strength", 399 Nature (1999), pp. 210-211.
Gong, et al., "Surfactant-Assisted Processing of Carbon Nanotube/Polymer Composites", 12 Chem. Mater. (2000), pp. 1049-1052.
Yudasaka, et al., "Effect of an organic polymer in purification and cutting of single-wall carbon nanotubes", 71 Appl. Phys. A (2000), pp. 449-451.
Vigolo, et al., "Macroscopic Fibers and Ribbons of Oriented Carbon Nanotubes", 290 Science (2000), pp. 1331-1334.
Coleman, et al., "Phase Separation of Carbon Nanotubes and Turbostatic Graphite Using . . . " 12 Adv. Mater. (2000), pp. 213-216.
Chen, et al., "Noncovalent Sidewall Functionalization of Single-Walled Carbon Nanotubes for Protein Immobilization", 123 J. Am. Chem. Soc. (2001), pp. 3838-3839.
Jin, et al., "Characterization and nonlinear optical properties of a poly(acrylic acid) . . . ", 332 Chem. Phys. Lett. (2000), pp. 461-466.
O'Connell, et al., "Reversible water-solubilization of single-walled carbon nanotubes by polymer wrapping", 342 Chem. Phys. Lett. (2001), pp. 265-271.
Star, et al., "Preparation and Properties of Polymer-Wrapped Single-Walled Carbon Nanotubes", 40 Angew. Chem. Int. Ed. (2001), pp. 1721-1725.
Dalton, et al., "Selective Interaction of a Semiconjugated Organic Polymer With Single-Wall Nanotubes", 104 J. Phys. Chem. B (2000), pp. 10012-10016.
Tang, et al., "Preparation, Alignment, and Optical Properties of Soluble Poly (phenylactylene)-Wrapped Carbon Nanotubes", 32 Macromolecules (1999). pp. 2569-2576.
Bahr, et al., "Covalent chemistry of single-wall carbon nanotubes", 12 J. Mater. Chem. (2002), pp. 1952-1958.

(Continued)

*Primary Examiner*—Stuart Hendrickson
(74) *Attorney, Agent, or Firm*—Winstead PC

(57) ABSTRACT

The present invention is directed toward a method of sidewall-functionalizing single-walled carbon nanotubes (SWNTs) through C—N bond forming substitution reactions with fluorinated SWNTs (fluoronanotubes), and to the sidewall-functionalized SWNTs comprising C—N bonds between carbons of the SWNT sidewall and nitrogens of the functionalizing groups made by these methods. Furthermore, when diamine species are utilized as reactants, novel materials like crosslinked SWNTs and "nanotube-nylons" can be generated.

Figure 1:
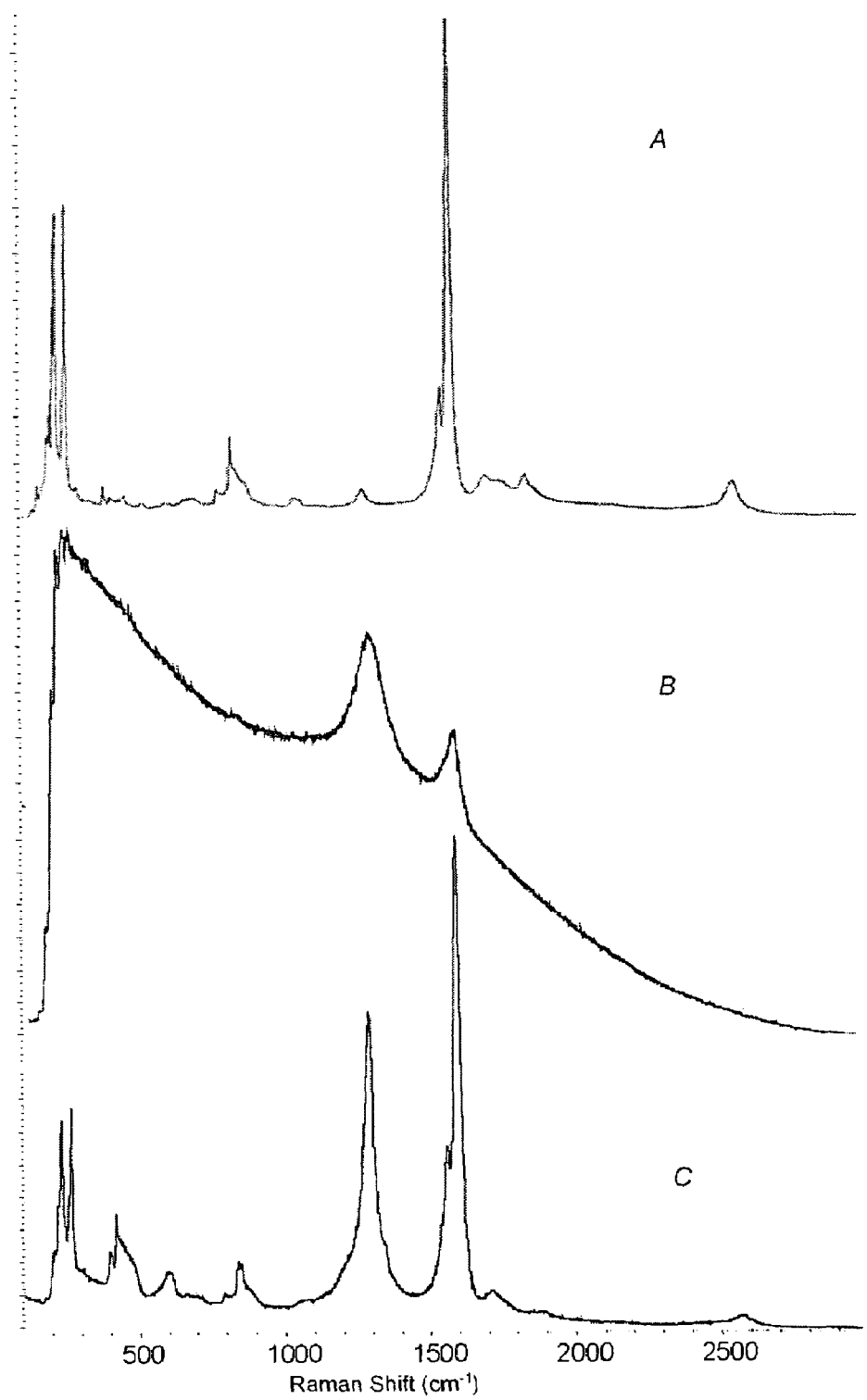

In some embodiments, SWNTs with functional groups covalently attached to their side walls through C—N bonds are prepared by either the direct interaction of fluoronanotubes with terminal alkylidene diamines or diethanolamine, or by a two-step procedure involving consecutive treatments with $Li_3N$ in diglyme and RCl (R=H, n-butyl, benzyl) reagents. Evidence for sidewall attachment of amine-derived groups has been provided by Raman, FTIR, and UV-vis-NIR spectra, SEM/EDAX and TEM data, and thermal degradation studies. The demonstrated new C—N functionalization methods offer a wide range of further SWNT derivatizations, including their covalent binding to aminoacids, DNA, and polymer matrixes.

37 Claims, 7 Drawing Sheets

OTHER PUBLICATIONS

Khabashesku, et al., "Fluorination of Single-Wall Carbon Nanotubes and Subsequent Derivatization Reactions", 35 Acc. Chem. Res. (2002), pp. 1087-1095.

Chen, et al., "Solution Properties of Single-Walled Carbon Nanotubes", 282 Science (1998), pp. 95-98.

Liu, et al., "Fullerene Pipes", 280 Science (1998), pp. 1253-1256.

Hamon, et al., "Dissolution of Single-Walled Carbon Nanotubes", 11 Adv. Mater. (1999), pp. 834-840.

Riggs, et al., "Strong Luminescence of Solubilized Carbon Nanotubes", 122 J. Amer. Chem. Soc. (2000), pp. 5879-5880.

Sun, et al., "Soluble Dendron-Functionalized Carbon Nanotubes: Preparation, Characterization and Properties", 13 Chem. Mater. (2001), pp. 2864-2869.

Mickelson, et al., "Fluorination of single-wall carbon nanotubes", 296 Chem. Phys. Lett. (1998), pp. 188-194.

Mickelson, et al. "Solvation of Fluorinated Single-Wall Carbon Nanotubes in Alcohol Solvents", 103 J. Phys. Chem. B (1999), pp. 4318-4322.

Boul, et al., "Reversible sidewall functionalization of buckytubes", 310 Chem. Phys. Lett. (1999), pp. 367-372.

Pekker, et al., "Hydrogenation of Carbon Nanotubes and Graphite in Liquid Ammonia", 105 J. Phys. Chem. B (2001), pp. 7938-7943.

Bahr, et al., "Functionalization of Carbon Nanotubes by Electrochemical Reduction . . . ", 123 J. Am. Chem. Soc. (2001), pp. 6536-6542.

Bahr, et al., "Highly Functionalized Carbon Nanotubes Using in Situ Generated Diazonium Compounds", 13 Chem. Mater. (2001), pp. 3823-3824.

Holzinger, et al., "Sidewall Functionalization of Carbon Nanotubes", 40 Angew. Chem. Int. Ed. (2001), pp. 4002-4005.

Peng, et al., "Sidewall functionalization of single-walled carbon nanotubes with organic peroxides", 362 Chem. Comm. (2003).

Georgakilas, et al., "Organic Functionalization of Carbon Nanotubes", 124 J. Am. Chem. Soc. (2001), pp. 760-761.

Tagmatarchis, et al., "Sidewall Functionalization of single-walled carbon nanotubes through electrophilic addition", 2010 Chem. Comm. (2002).

Bettinger, et al., "Thermochemistry of Fluorinated Single Wall Carbon Nanotubes", 123 J. Am. Chem. Soc. (2001), pp. 12849-12856.

Chiang, et al., "Purification and Characterization of Single-Wall Carbon Nanotubes", 105 J. Phys. Chem. B (2001), pp. 1157-1161.

Chiang, et al., "Purification and Characterization of Single-Wall Carbon Nanotubes Obtained from the Gas-Phase Decomposition of CO(HiPco Process)", 105 J. Phys. Chem. B (2001), pp. 8297-8301.

Gu, et al., "Cutting Single-Wall Carbon Nanotubes Through Fluorination", 2 Nano. Lett. (2002), pp. 1009-1013.

Nikolaev, et al., "Gas-phase catalytic growth of single-walled carbon nanotubes from carbon monoxide", 313 Chem. Phys. Lett. (1999), pp. 91-97.

Moore, "Amino Acid Analysis: Aqueous Dimethyl Sulfoxide As Solvent for the Ninhydrin Reaction", J. Biol. Chem.(1968), p. 6281.

Lin-Vien, et al., "The Handbook of Infrared and Raman Characteristic Frequencies..", Academic Press Inc. (1999), p. 299.

Khabashesku, et al., "Polymerization of Single-Wall Carbon Nanotubes under High Pressures and High Temperatures", 106 J. Phys. Chem. B (2002), pp. 11155-11162.

* cited by examiner

A

B

SIDEWALL FUNCTIONALIZATION OF SINGLE-WALL CARBON NANOTUBES THROUGH C-N BOND FORMING SUBSTITUTIONS OF FLUORONANOTUBES

CROSS REFERENCE TO RELATED APPLICATIONS

This Application claims priority to U.S. Provisional Patent Application Ser. No. 60/427,102 filed Nov. 18, 2002.

This invention was made with support from the Robert A. Welch Foundation, Grant No. C-0109, The Texas Higher Education Coordinating Board's Advanced Technology Program, Grant No. 003604-0026-2001, and the National Aeronautics and Space Administration, Grant No. NAGW-2845.

FIELD OF THE INVENTION

The present invention is related generally to carbon nanotube materials, and more specifically to methods of chemically functionalizing single-wall carbon nanotubes.

BACKGROUND

Single-wall carbon nanotubes (SWNTs) have unique structural, electronic and mechanical properties that make them appealing for a variety of applications [Ijima et al., Nature, 363, 603-605, 1993; Lansbury et al., J. Am. Chem. Soc., 120, 603-604, 1998; Yu et al., Phys. Rev. Lett., 84, 5552-5555, 2000; Baughman et al., Science, 297, 787-792, 2002; Odom et al., J. Phys. Chem. B 104, 2794-2809, 2000; Kong et al., Science 287, 622-625, 1998; Rao et al., Chem Phys Chem, 2, 78-105, 2001; Gao et al., Adv. Mater., 13, 1770-1773, 2001]. For instance, the remarkable tensile strength of SWNTs has led to the fabrication of a variety of nanotube-reinforced fibers and composite materials [Calvert, Nature, 399, 210-211, 1999; Gong et al., Chem. Mater., 12, 1049-1052, 2000; Yudasaka et al., Appl. Phys. A, 71, 449-451, 2000; Vigolo et al., Science, 290, 1331-1334, 2000; Coleman et al., Adv. Mater., 12, 213-216, 2000]. However, a major barrier to fully exploiting the unique properties of SWNTs exists, especially in the area of nanotube-reinforced fibers and composites. As processing and manipulation techniques for making such nanotube composites generally rely on dispersion and solubilization of the SWNTs, the nanotubes' inherent insolubility in water and most common organic solvents presents a problem.

In order to overcome this problem by producing soluble SWNT samples, work continues to evolve in the areas of non-covalent surfactant [Chen et al., J. Am. Chem. Soc., 123, 3838-3839, 2001; Jin et al., Chem. Phys. Lett., 332, 461-466, 2000] or polymer wrapping [O'Connell et al., Chem. Phys. Lett., 342, 265-271, 2001; Star et al., Angew. Chem. Int. Ed., 40, 1721-1725, 2001; Dalton et al., J. Phys. Chem. B, 104, 10012-10016, 2000; Tang et al., Macromolecules, 32, 2569-2576, 1999] modification of SWNTs, as well as on covalent functionalization [Bahr et al, J. Mater. Chem., 12, 1952-1958, 2002 ("Bahr I"); Khabashesku et al., Acc. Chem. Res., 35, 1087-1095, 2002 ("Khabashesku")] utilizing both the open end [Chen et al., Science, 282, 95-98, 1998; Liu et al., Science, 280, 1253-1256, 1998 ("Liu"); Hamon et al., Adv. Mater., 11, 834-840, 1999; Riggs et al., J. Am. Chem. Soc., 122, 5879-5880, 2000; Sun et al., Chem. Mater., 13, 2864-2869, 2001] and sidewall [Mickelson et al., Chem. Phys. Lett. 296, 188-194, 1998 ("Mickelson I"); Mickelson et al., J. Phys. Chem. B 103, 4318-4322, 1999 ("Mickelson II"); Boul et al., Chem. Phys. Lett. 310, 367-372, 1999; Pekker et al., J. Phys. Chem. B, 105, 7938-7943, 2001 ("Pekker"); Bahr et al., J. Am. Chem. Soc. 123, 6536-6542, 2001 ("Bahr II"); Bahr et al., Chem. Mater. 13, 3823-3824, 2001 ("Bahr III"); Holzinger et al., Angew. Chem. Int. Ed. 40, 4002-4005, 2001 ("Holzinger")] chemistry of SWNTs. Besides the general improvement in the solubility and processibility achieved by these approaches, the sidewall functionalizations, in particular, provide the most significant alteration of the structural and electronic properties of the SWNTs—yielding new nanotube derivatives with useful properties of their own. The direct addition of fluorine [Mickelson I; Mickelson II], hydrogen [Pekker], aryl groups [Bahr II; Bahr III], nitrenes, carbenes, and radicals [Holzinger; Peng et al., Chem. Comm., 362, 2003], as well as 1,3-dipolar and electrophilic additions [Georgakilas et al., J. Am. Chem. Soc. 124, 760-761, 2001; Tagmatarchis et al., Chem. Commun. 2010, 2002], to the side walls of pristine SWNTs have been reported. In the earliest reports on sidewall functionalization chemistry [Mickelson I; Mickelson II], it was shown that fluorine substituents on SWNTs (i.e., fluorinated SWNTs or fluoronanotubes) can be readily displaced by alkyl groups using Grignard or alkyl-lithium reagents which attach alkyl groups to the SWNT sidewalls through C—C bonds. These reactions are facilitated by C—F bonds on the fluoronanotube that are weaker than the C—F bonds in alkylfluorides, and which impart stronger electron accepting ability to the fluoronanotubes in comparison to pristine SWNTs [Bettinger et al., J. Am. Chem. Soc. 123, 12849-12856, 2001]. Such enhanced reactivity of fluoronanotubes opens opportunities for sidewall attachment of a variety of substituents. For instance, nanotubes comprising terminal amino- or hydroxyl-functional groups can be useful for further chemical modifications, were such species readily synthesizable.

SUMMARY

The present invention is directed toward a method of sidewall-functionalizing single-walled carbon nanotubes (SWNTs) through C—N bond forming substitution reactions with fluorinated SWNTs (fluoronanotubes), and to the sidewall-functionalized SWNTs comprising C—N bonds between carbons of the SWNT sidewall and nitrogens of the functionalizing groups made by these methods. Furthermore, when diamine species are utilized as reactants, novel materials like crosslinked SWNTs and "nanotube-nylons" can be generated.

In some embodiments, SWNTs with functional groups covalently attached to their side walls through C—N bonds are prepared by either the direct interaction of fluoronanotubes with terminal alkylidene diamines or diethanolamine, or by a two-step procedure involving consecutive treatments with $Li_3N$ in diglyme and RCl (R=H, n-butyl, benzyl) reagents. Evidence for sidewall attachment of amine-derived groups has been provided by Raman, FTIR, and UV-vis-NIR spectra, SEM/EDAX and TEM data, and thermal degradation studies. The demonstrated new C—N functionalization methods offer a wide range of further SWNT derivatizations, including their covalent binding to aminoacids, DNA, and polymer matrixes.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTIONS OF THE DRAWINGS

Figure 2:
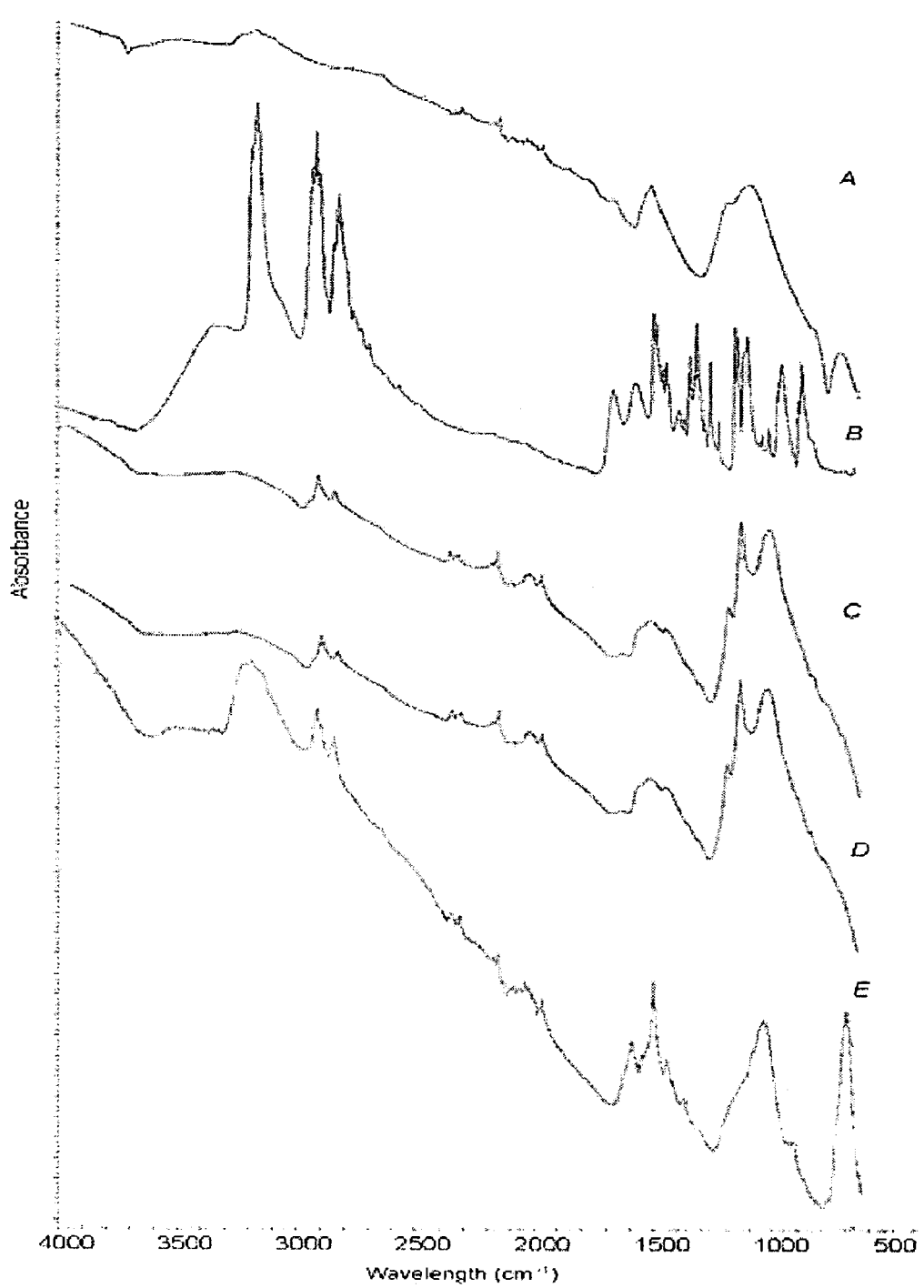
Figure 3:
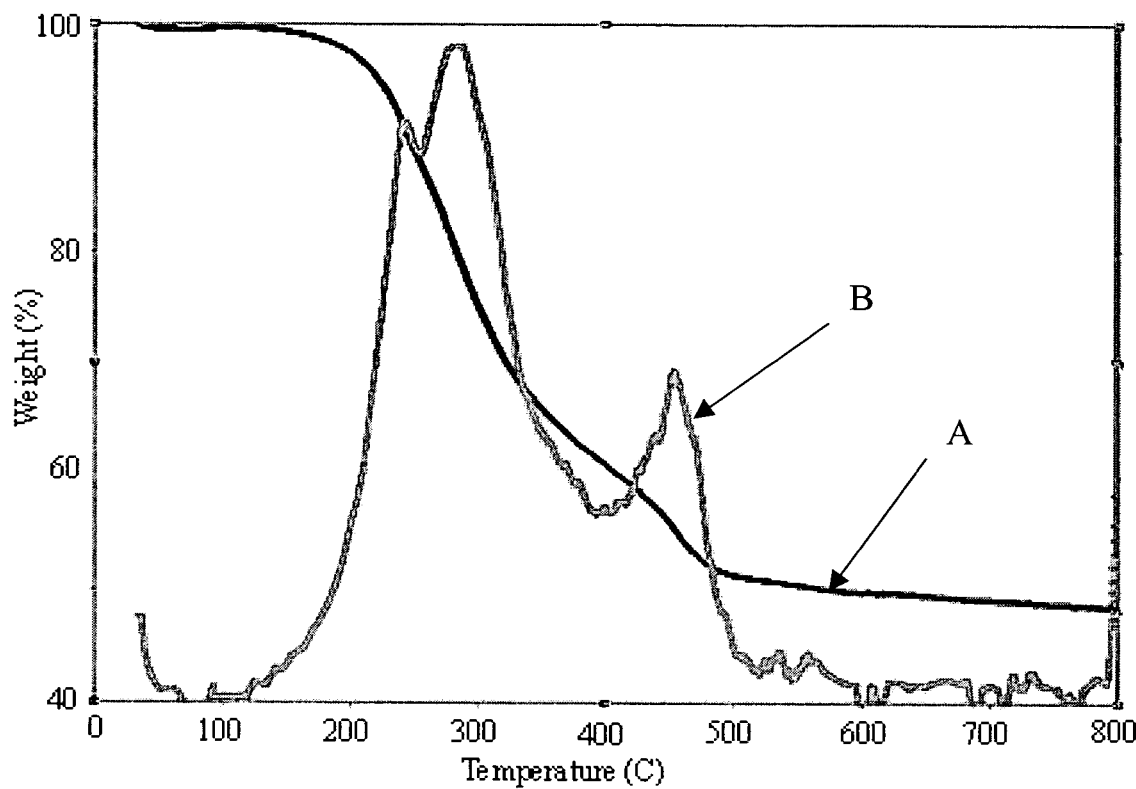
Figure 4:
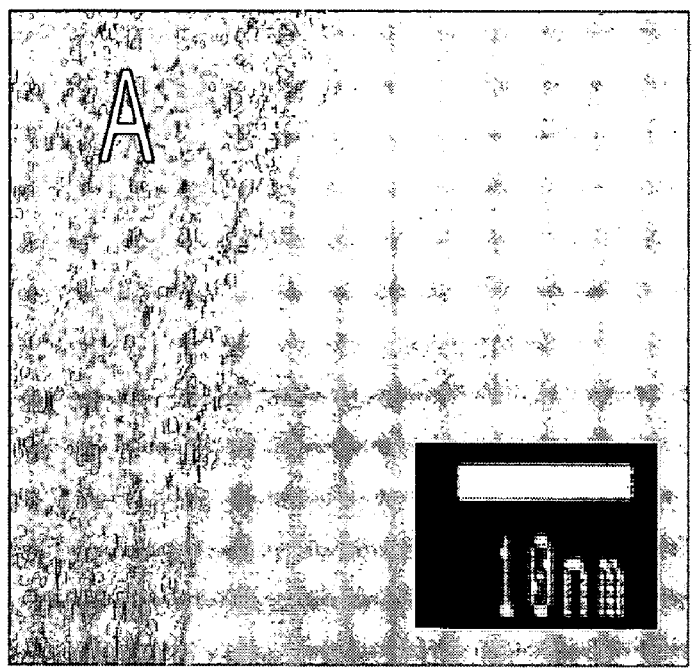
Figure 4:
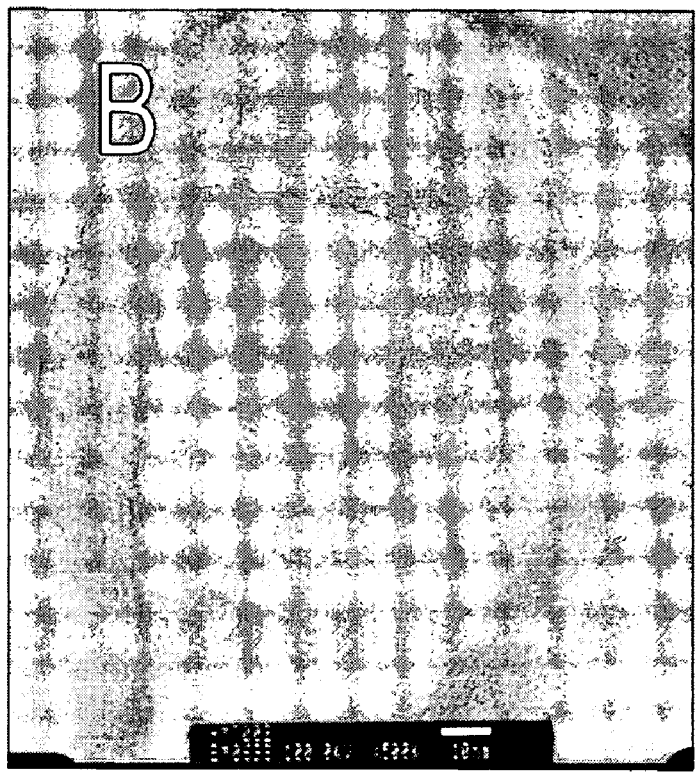
Figure 5:
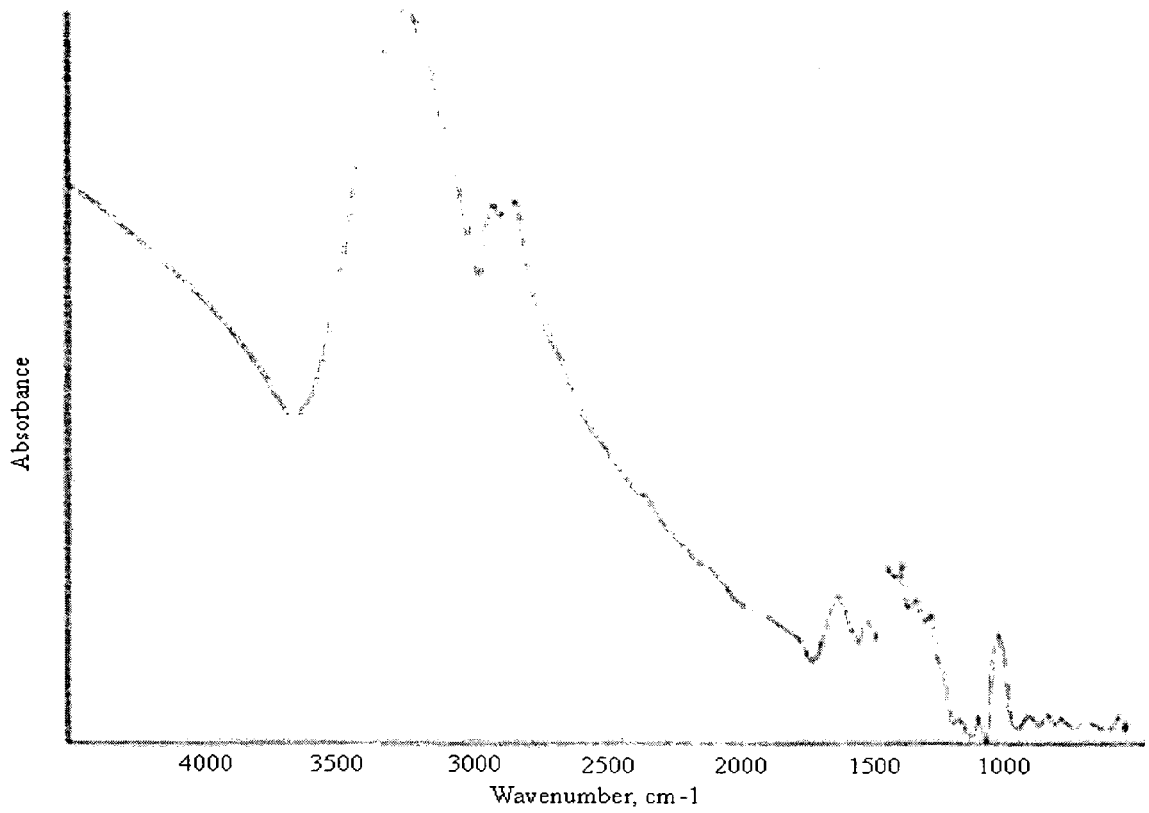
Figure 6:
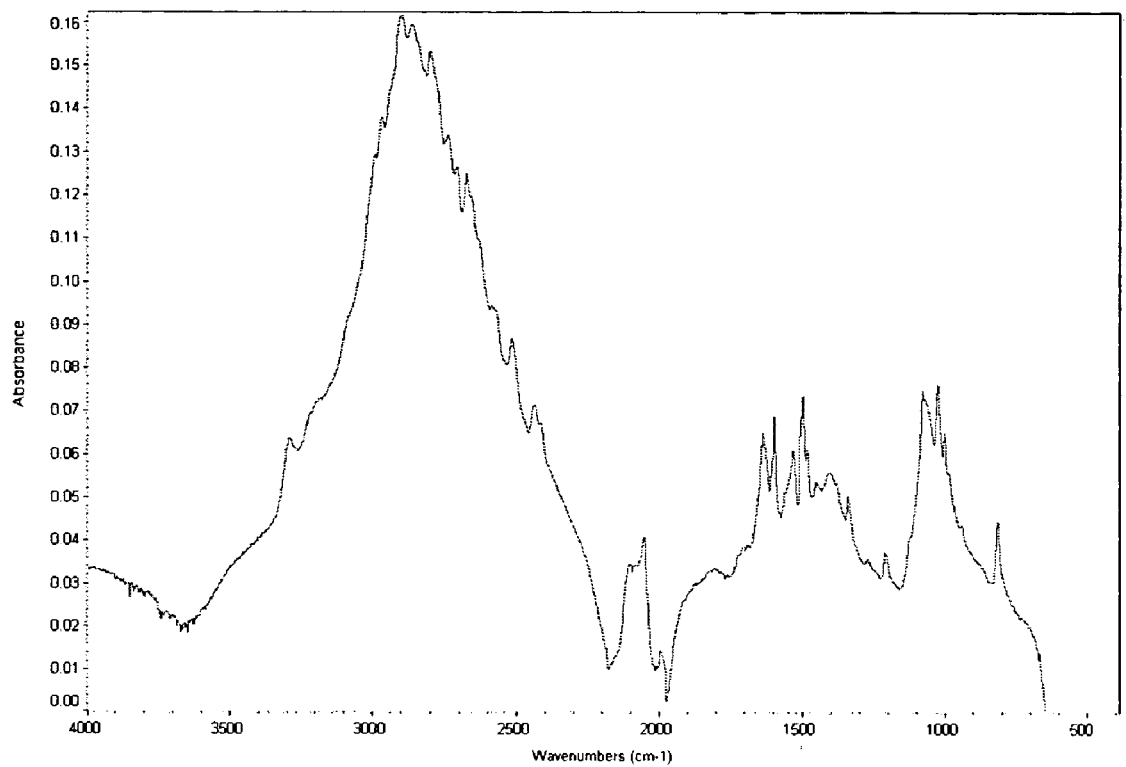
Figure 7:
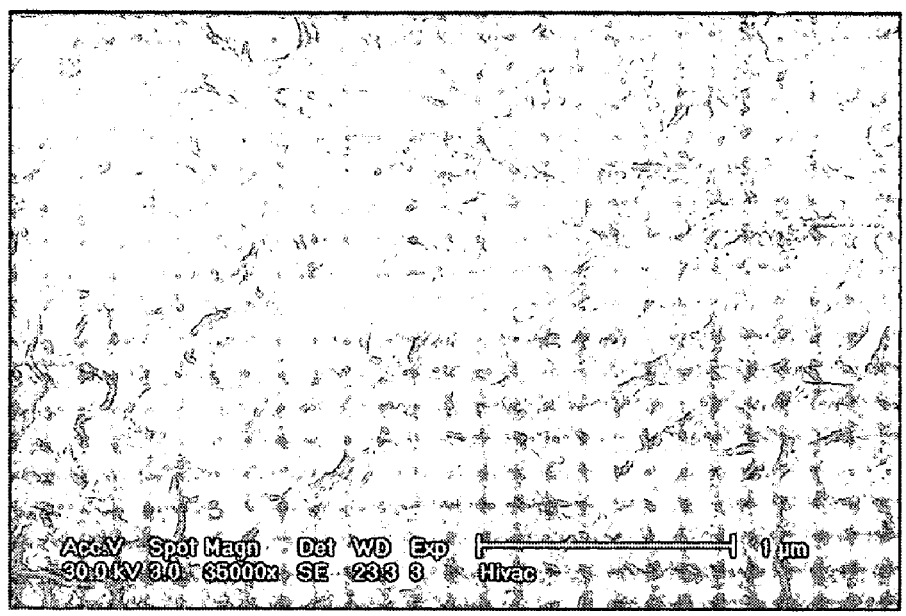
Figure 7:
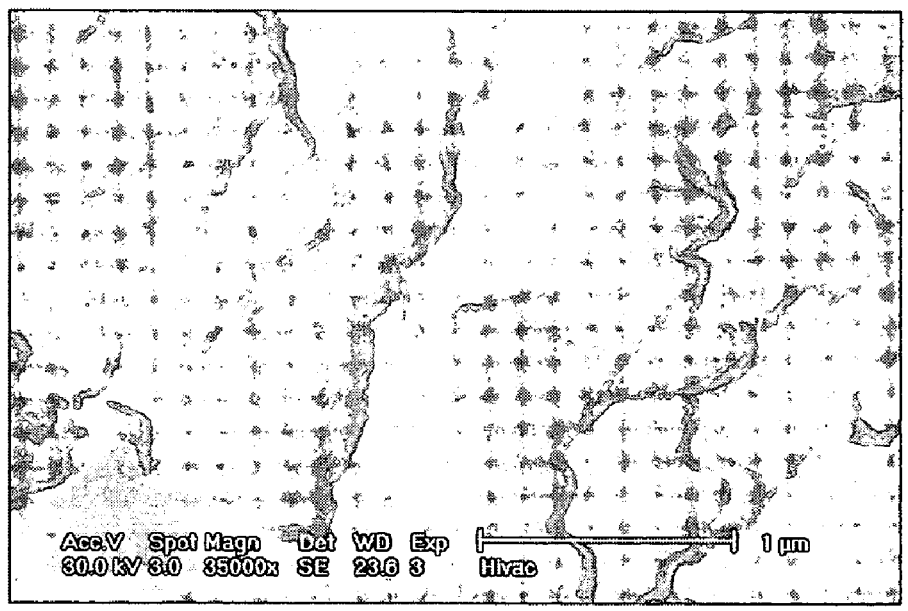

For a more complete understanding of the present invention, and the advantages thereof, reference is now made to the following descriptions taken in conjunction with the accompanying drawings, in which:

FIGS. 1 A-C depict Raman spectra of purified HiPco-SWNTs (A), fluoronanotubes 1 (B), and functionalized SWNTs 3a (C);

FIGS. 2 A-E depict ATR-FTIR spectra of fluoronanotubes 1 (A), and functionalized SWNTs: 3a (B), 3b(C), 3c(D), 3d(E);

FIGS. 3 A and B depict TGA (A) and DTA (B) data plots for 3a;

FIGS. 4 A and B depict TEM images of N-alkylidene amino-functionalized SWNTs 3a (A), and 3d (B);

FIG. 5 depicts an ATR-FTIR spectrum of 5;

FIG. 6 depicts an ATR-FTIR spectrum of "nylon-nanotube" polymer derivative 5; and FIGS. 7 A and B depict SEM images of fluoronanotubes 1 (A) and "nylon-nanotube" polymer derivative 5 (B).

DETAILED DESCRIPTION

The present invention is directed toward a method for sidewall functionalizing single-wall carbon nanotubes (SWNTs) through C—N bond forming substitution reactions of fluoronanotubes and to the functionalized SWNTs generated via this method. Depending on the functional groups used, the present invention is also directed toward further derivatization of the functionalized SWNTs and to the novel compositions produced by such further derivatization.

Single-wall carbon nanotubes, according to the present invention, can be made by any known method. Such methods include, but are not limited to, arc-synthesis, laser-oven, flame synthesis, chemical vapor deposition methods, supported catalyst techniques, HiPco techniques, and combinations thereof. Such nanotubes can be used as-produced, or they can be purified by a purification technique. Acceptable purification techniques include, but are not limited to, those disclosed by Chiang et al. [Chiang et al., J. Phys. Chem. B, 105, 1157-1161, 2001 ("Chiang I"); Chiang et al., J. Phys. Chem. B, 105, 8297-8301, 2001 ("Chiang II"), both of which are incorporated herein by reference]. Such nanotubes can have any length, diameter, chirality, and distributions or combinations thereof. The nanotubes are generally selected from the group consisting of metallic nanotubes, semiconducting nanotubes, semimetallic nanotubes, and comnbinations thereof. In some embodiments, the nanotubes are separated based on their (n,m) indices. In some embodiments, the nanotubes are cut by a cutting process. See Liu; Gu et al., Nano Lett., 2, 1009-1013, 2002 ("Gu"), both of which are incorporated herein by reference.

The diameter of single-wall carbon nanotubes, according to the present invention, ranges generally from about 0.5 nm to about 2.0 nm, and more typically from about 0.7 nm to about 1.4 nm. The length of single-wall carbon nanotubes, according to the present invention, ranges generally from about 10 nm to several hundred micrometers (μm), and more typically from about 100 nm to about 3 μm.

Fluorinated SWNTs (F-SWNTs) or fluoronanotubes, according to the present invention, comprise SWNTs with fluorine attached to their sidewalls and ends. The fluoronanotubes have a stoichiometric formula $CF_n$, where n ranges generally from about 0.01 to about 0.80, and more typically from about 0.1 to about 0.5. Such fluoronanotubes are described in commonly-assigned copending U.S. patent application Ser. No. 09/787,473; and I. W. Chiang, Ph.D. Dissertation, Rice University, 2001 ("Chiang III"); both of which are incorporated herein by reference; and Gu. Fluoronanotubes such as these are generally produced by direct fluorination.

C—N bond forming reactions, according to the present invention, involve the covalent attachment of a functional group, comprising at least one nitrogen atom, to SWNT sidewalls via covalent bond formation between the nitrogen atom in the functional group and a carbon atom in the sidewall of the SWNT structure. In the present invention, such C—N bond formation is effected by first fluorinating the SWNT. While not intending to be bound by theory, fluorinated SWNTs (fluoronanotubes) are believed to possess a greater ability to accept electrons compared with non-fluorinated SWNTs.

Sidewall functionalization, according to the present invention, comprises the covalent attachment of functional groups (atoms or molecules) to the sidewalls of SWNTs. Such functionalization, however, does not preclude attachment of functional groups to the ends of SWNTs as well.

In some embodiments, the present invention is a method for functionalizing SWNTs comprising: 1) selecting a plurality of SWNTs; 2) fluorinating the SWNTs to form fluorinated SWNTs (fluoronanotubes); and 3) reacting the fluoronanotubes with a species comprising at least one amine functionality to form aminated SWNTs functionalized through carbon-nitrogen (C—N) covalent bonds to their sidewalls.

According to the present invention, the species comprising at least one amine functionality is an amine having the general formula

where R, R', and R" are selected from the group consisting of —H, alkyl, aryl, hydroxyalkyl, aminoalkyl, alkoxy, aryloxy, thioalkyl, thioaryl, and combinations thereof. In some embodiments, R, R', and R" are all the same, in some embodiments they are all different, and in some embodiments two are the same and one is different. In some embodiments, the species comprising at least one amine functionality is selected from the group consisting of $NH_3$, primary amines, secondary amines, tertiary amines, diamines, triamines, and combinations thereof. In some embodiments, the species comprising at least one amine functionality is an amino acid. In some embodiments, the species comprising at least one amine functionality is a diamine comprising the general formula $H_2N$—$(CH_2)_n$—$NH_2$, wherein n is an integer which ranges from 1 to about 20.

In some embodiments, the species comprising at least one amine functionality is added in molar excess (e.g., moles of species exceed moles of carbon of which the SWNTs are comprised).

In some embodiments, the reaction comprises a solvent. In such embodiments, the fluoronanotubes are first dispersed in the solvent. Such dispersal may involve ultrasonication. Suitable solvents include, but are not limited to, N,N-dimethylformamide (DMF), alcohols, and combinations thereof. In some embodiments, it is the solvent which bears the amine functionality and reacts with the fluoronanotubes. Applicant recognizes that in such embodiments, the solvent is a reactant.

In some embodiments, the reaction between the fluoronanotubes and the species comprising at least one amine functionality utilizes a catalyst. Such catalysts include, but are not limited to, pyridine, triethyl amine, and combinations thereof.

In some embodiments, the reaction is heated by a heating method. Suitable reaction temperatures, which can be induced by said heating method, can range generally from about 70° C. to about 170° C., and more typically from about 120° C. to about 140° C. Heating methods include, but are not limited to, thermal heating, microwave heating, heat lamps, and combinations thereof.

In some embodiments, the reaction is carried out under an inert atmosphere. Inert atmospheres include, but are not limited to, nitrogen, argon, helium, and combinations thereof.

The reaction is carried out for a period of time which ranges generally from about 1 hour to about 5 hours, and more typically from about 2 hours to about 3 hours.

Some embodiments of the present invention comprise a number of post-reaction processing steps. Such post-reaction processing steps include, but are not limited to, centrifugation, decanting, filtration, washing, drying, and combinations thereof.

Filtration typically comprises vacuum filtration using a Teflon (PTFE) or Teflon-coated filter membrane with a sufficiently small pore size to capture all or most of the product. The filtered product is then typically washed with a non-reacting solvent possessing a vapor pressure that renders it reasonably easy to remove. Exemplary washing solvents include, but are not limited to, methanol, ethanol, iso-propanol, and combinations thereof. Drying is typically accomplished in a vacuum oven at a temperature which ranges from about 70° C. to about 100° C.

In some embodiments, when the species comprising at least one amine functionality is a diamine, crosslinking of the SWNTs is achievable, wherein SWNTs are linked by a —N(H)—(CH$_2$)$_n$—N(H)— bridging species, for example. In other of these embodiments, further reaction of a species with adipoyl chloride yields "nanotube-nylons."

In some embodiments, the present invention provides a method comprising: 1) selecting a plurality of SWNTs; 2) fluorinating the SWNTs to form fluoronanotubes; 3) reacting the fluoronanotubes with Li$_3$N to form an intermediate species, SWNT-[NLi$_2$]$_x$; and 4) reacting said intermediate species with a halide-containing species, R—X, to form aminated SWNTs functionalized through C—N covalent bonds to their sidewalls.

In reacting the fluoronanotubes with Li$_3$N to form an intermediate species, a solvent may be used. Suitable solvents include, but are not limited to, digyme, dioxane, crown ethers, and combinations thereof.

In some embodiments, the step of reacting the fluoronanotubes with Li$_3$N to form an intermediate species involves a reaction temperature. Such a reaction temperature ranges generally from about 80° C. to about 170° C., and more typically from about 90° C. to about 120° C., and which can be induced by a heating method selected from the group consisting of thermal heating, microwave heating, heat lamps, and combinations thereof. In some embodiments, the reaction is refluxed in an appropriate solvent (e.g., diglyme).

In some embodiments, the step of reacting the fluoronanotubes with Li$_3$N to form an intermediate species is carried out under an inert atmosphere. Suitable inert atmospheres include, but are not limited to, nitrogen, argon, helium, and combinations thereof.

The step of reacting the fluoronanotubes with Li$_3$N to form an intermediate species generally comprises a first reaction duration. Such first reaction durations range generally from about 1 hour to about 6 hours, and more typically from about 2 hours to about 3 hours.

A halide-containing species, according to the present invention, has the general formula R—X, where X is selected from the group consisting of F, Cl, Br, I, and combinations thereof, and R is selected from the group consisting of —H, alkyl, aryl, substituted alkyl, substituted aryl, and combinations thereof.

The step of reacting said intermediate species with a halide-containing species, R—X, to form aminated SWNTs typically involves a second reaction duration, temperature, and atmosphere. This second reaction duration ranges generally from about 0.5 hours to about 3 hours, and more typically from about 1 hour to about 2 hours. This second reaction temperature can range generally from about 25° C. to about 100° C., and more typically from about 25° C. to about 70° C. The atmosphere under which this second reaction is carried out can be an inert atmosphere selected from the group consisting of nitrogen, argon, helium, and combinations thereof.

Various post-reaction processing steps may be carried out which include, but are not limited to, filtration, washing, drying, and combinations thereof. Filtration is typically vacuum filtration with a Teflon or Teflon-coated membrane filter having a pore size which typically ranges from about 0.2 μm to about 1 μm. Washing is generally done with a non-reacting solvent with which reactant materials and by-products can be easily removed, and which itself can be easily removed through evaporation. Suitable solvents include, but are not limited to, methanol, ethanol, water, and combinations thereof. Drying is typically carried out in a vacuum oven at a temperature which ranges from about 70° C. to about 100° C., but can generally be any drying method which suitably removes solvents that are present.

The present invention provides functionalized SWNTs of the type:

SWNT-[N(R)R']$_x$ wherein amino functionalities [N(R)R']$_x$ are bound to the SWNTs through carbon-nitrogen covalent bonds to their sidewalls, and where R and R' can be the same or different and x represents an integer greater than or equal to 1. R and R' are selected from the group consisting of —H, alkyl, aryl, substituted akyl, substituted aryl, alkoxy, hydroxy alkyl, thioalkyl, and combinations thereof. In some embodiments, there may be some fluorine covalently attached to the functionalized SWNTs of the present invention. Depending on processing techniques, the ends of the functionalized SWNTs can be open or closed.

Depending on the embodiment, the length and diameter of the SWNTs, and on the various types of R and R' species present, x can vary widely. Typically, the number of substituents per nanotube carbon ranges generally from about 0.005 to about 0.5, and more typically from about 0.01 to about 0.25.

Such functionalized SWNTs of the present invention possess a level of solubility in primary amines, alcohols, water, and dilute acides which exceeds that of non-functionalized SWNTs. Furthermore, such functionalized SWNTs, having a far richer chemistry than unfunctionalized SWNTs, can serve as precursors for a wide range of additional chemical reactions and further chemical functionalizations.

Such amino-functionalized SWNTs of the present invention can be used in various solution- or liquid-phase reactions involving functional group exchange. For example, reaction with adipoyl chloride to form new "nylon-nanotube" materials, attachment to DNA or proteins, or covalently binding nanotubes to organic polymer and inorganic matrices for superior composite materials.

EXAMPLES

The following examples are included to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

Referring to Scheme 1, this example illustrates a method of making aminoalkylated SWNTs in accordance with the present invention, wherein aminoalkylated SWNTs are synthesized by direct interaction of fluoronanotubes 1 with terminal diamines 2a-d. See Stevens et al., Nano Lett., 3(3), 331-336, 2003, incorporated herein by reference.

Scheme 1

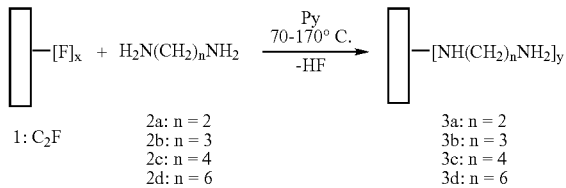

1: $C_2F$

2a: n = 2
2b: n = 3
2c: n = 4
2d: n = 6

3a: n = 2
3b: n = 3
3c: n = 4
3d: n = 6

Fluoronanotubes were prepared by the direct fluorination of purified HiPco-SWNTs [Nikolaev et al., Chem. Phys. Lett. 313, 91-97, 1999 ("Nikolaev"); Chiang II] at 150° C. yielding a stoichiometry of approximately $C_2F$, according to a procedure described elsewere [Chiang III; Gu]. Fluoronanotubes 1 were reacted with diamines 2a-d, such as ethylene 2a, propylene 2b, butylene 2c, and hexamethylene diamine 2d (Scheme 1) in the liquid phase by stirring the reactants at elevated temperatures (70-170° C.) in the presence of pyridine (Py) as a catalyst. The intermolecular elimination of HF in the reactions of 1 with 2a-d resulted in the formation of the corresponding aminoalkylated SWNTs 3a-d.

In these experiments a milligram quantity (normally 10-20 mg) of precursor 1 was placed into the reaction vessel and 5-20 ml of diamine 2a-d was added. Subsequent ultrasonication for approximately three minutes caused an almost complete dispersion of fluoronanotubes and formed a black colored solution. Thereafter, five drops of Py were added and the reaction mixture was stirred under a nitrogen atmosphere for approximately three hours at approx. 150-170° C. After completion of the reaction and cooling to room temperature, the post-reaction processing steps (work-up) involved centrifugation to separate insoluble black material. The decanted solution was filtered with a 0.2 μm pore size Teflon membrane (Cole Palmer) and the functionalized SWNTs 3a-d were caught on the filter and washed with ethanol and dried overnight in a vacuum oven at about 70° C.

Fourier transform infrared (FTIR), Raman, and UV-vis-NIR spectroscopies, scanning electron microscopy/energy-dispersive analysis of X-rays (SEM/EDAX), transmission electron microscopy (TEM), variable temperature-mass spectrometry (VTP-MS), and thermal gravimetric analysis/differential thermal analysis (TGA/DTA), were all used to confirm the sidewall attachment of the aminoalkyl functional groups.

Evidence for the significant alteration of the electronic state of products 3a-d due to sidewall functionalization was obtained by Raman and UV-vis-NIR spectroscopy. FIG. 1 depicts various Raman spectra, wherein purified HiPco-SWNTs (FIG. 1A) shows breathing and tangential mode peaks at 200-263 and 1591 $cm^{-1}$, respectively, which were observed to decrease in the spectrum for fluoronanotubes 1 (FIG. 1B) and the peak at 1291 $cm^{-1}$ to increase dramatically owing to the large presence (nearly 50%) of $sp^3$-hybridized carbons in the $C_2F$ composition structure of 1. The substantial relative intensity of the $sp^3$ carbon peak at 1291 $cm^{-1}$, observed in 3a (FIG. 1C) and the other samples 3b-d provides a diagnostic indication of disruption of the graphene π-bonded electronic structure of the sidewalls, suggesting their covalent functionalization. This was further confirmed by the solution-phase UV-vis-NIR spectra of nanotube-derivatives 3a-d, which were typical for functionalized SWNTs [Bahr I; Bahr II; Bahr III; Khabashesku; Chiang III; and Gu], showing complete loss of the van Hove absorption band structures, routinely observed in purified HiPco-SWNTs [Nikolaev; Chiang II].

The ATR-FTIR spectra allow the identification of aminoalkyl functionalities on the SWNTs. The two intense peaks at 1214 and 1102 $cm^{-1}$, characteristic of C—F bond stretches in fluoronanotubes 1 (FIG. 2A), disappear after the reaction with diamines 2a-d (FIGS. 2B-E). The appearance of new peaks in the 2800-3000 $cm^{-1}$ region, attributed to the N—H and C—H stretches, provide strong indication of the aminoalkyl group attachment to the nanotube sidewalls in 3a-d. Interestingly, the intensities of the $NH_2$ and C—H peaks were observed to be weaker in 3b-c relative to 3a. While not intending to be bound by theory, this is probably due to the possibility of partial dual buckling of 2b-c to the sidewall or crosslinking of the SWNTs by longer chain alkylidenediamino groups.

The elemental analyses of 3a-d by SEM/EDAX yielded, for all samples, significant nitrogen content (within 12-17 atomic %) as well as a very low (1-2 atomic %) fluorine content, verifying the efficient displacement of F by the amino functionalities. The thermal degradation studies have provided further evidence for covalent functionalization. As an example, the TGA/DTA analysis of 3a in FIG. 3 shows the TGA plot (FIG. 3A) and the DTA plot (FIG. 3B), the latter showing a major peak at 300° C. and a minor peak at 450° C. which corresponds to the two-step loss of ethylene diamine 2a evolving at temperatures obviously too high to be due to physisorbed species. The same analysis for 3d also yielded a two-step degradation mechanism with the loss of hexamethylene diamine 2d in the 400-550° C. temperature range. The VTP-MS analyses of 3a-d show a major loss of corresponding attached groups under vacuum conditions at approx. 350-500° C., which were detected as a peak in the mass spectra. The TEM studies have revealed, in addition to the individual functionalized SWNTs which were successfully imaged in case of the 3a specimen, a large number of cross-linked nanotubes, abundant in the case of the larger chain aminoalkyl functionalized SWNTs, e.g., 3d (see FIG. 4). Nevertheless, all terminal amino-functionalized samples 3a-d have been tested positively by the Kaiser testing procedure [Moore, J. Biol. Chem., 243, 6281, 1968 ("Moore")] for free $NH_2$ groups. Their availability may help to improve the solubility of nanotubes in primary amines, alcohols, water, and dilute acids and also give access to various solution phase reactions involving functional group interchange, for example, with the adipoyl chloride to form new "nylon-nanotube" materials or to attach a DNA base to the SWNTs or to bind nanotubes to organic polymers and inorganic matrices.

Example 2

Referring to Scheme 2, this example illustrates a method of making aminoalkyl-hydroxylated SWNTs in accordance with the present invention, wherein the aminoalkyl-hydroxylated SWNTs are synthesized by direct interaction of 1 with diethanolamine 4 (Scheme 2).

Scheme 2

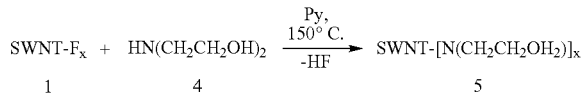

Fluoronanotubes were prepared by the direct fluorination of purified HiPco-SWNTs [Nikolaev; Chiang II] at 150° C. to approximately $C_2F$ stoichiometry according to a procedure described elsewere [Chiang III; Gu]. Fluoronanotubes 1 were reacted with diethanolamine 4 (Scheme 2) in the liquid phase by stirring the reactants at elevated temperatures (70-170° C.) in the presence of pyridine (Py) as a catalyst. The intermolecular elimination of HF in the reaction of 1 with 4 resulted in the formation of aminoalkyl-hydroxylated SWNTs 5.

In these experiments, a milligram quantity (normally 10-20 mg) of precursor 1 was placed into the reaction vessel and 5-20 ml of diethanolamine 4 was added. Subsequent ultrasonication, for about three minutes, caused almost complete dispersion of the fluoronanotubes to form a black colored solution. Thereafter, five drops of Py were added and the reaction mixture stirred under a nitrogen atmosphere for approx. three hours at approx. 150-170° C. After completion of the reaction and cooling to room temperature, the work-up involved centrifugation to separate insoluble black material. The decanted solution was filtered with a 0.2 μm pore size Teflon membrane (Cole Palmer) and the functionalized SWNTs 5 were caught on the filter and washed with ethanol and dryed overnight in a vacuum oven at 70° C.

FTIR, Raman, and UV-vis-NIR spectroscopies, SEM/EDAX, TEM, variable temperature-mass spectrometry (VTP-MS), and TGA were all used to confirm the sidewall attachment of the aminoalkyl-hydroxyl functional groups.

Evidence for the significant alteration of the electronic state of 5 due to sidewall functionalization was obtained by Raman and UV-Vis-NIR spectroscopies. In a manner similar to that described in Example 1, the typical breathing and tangential mode peaks at 200-263 and 1591 $cm^{-1}$, respectively for purified HiPco-SWNTs were observed to decrease in fluoronanotubes 1 and the peak at 1291 $cm^{-1}$ to increase dramatically—owing to a large presence of $sp^3$-hybridized carbons in the $C_2F$ composition structure of 1. The substantial relative intensity of the $sp^3$ carbon peak at 1291 $cm^{-1}$ observed in 5 provides a diagnostic indication of disruption within the graphene π-bonded electronic structure of the sidewalls, suggesting their covalent functionalization. This was further confirmed by the solution-phase UV-vis-NIR spectra of 5 which is typical of functionalized SWNTs [Bahr I; Bahr II; Bahr III; Khabashesku; Chiang III; and Gu] showing complete loss of the van Hove absorption band structures, routinely observed in purified HiPco-SWNTs [Nikolaev; Chiang II].

The ATR-FTIR spectra allow the identification of aminoalkyl functionalities on the SWNTs. The two intense peaks at 1214 and 1102 $cm^{-1}$, characteristic of C—F bond stretches in fluoronanotubes 1, disappear after the reaction with diethanolamine 4 (FIG. 5) as a result of fluorine displacement. The appearance of new peaks in the 3100-3400 and 2800-3000 $cm^{-1}$ regions, attributed to the O—H, N—H and C—H stretches, respectively, provide strong indication of the aminoalkyl-hydroxyl groups in 5.

The elemental analyses of 5 by SEM/EDAX yielded significant nitrogen content (about 8 atomic %) as well as a very low fluorine content (less than 2 atomic %), validating efficient displacement of F by the amino functionalities. The thermal degradation studies have provided further evidence of covalent functionalization.

Example 3

Referring to Scheme 3, this example illustrates another method of making aminoalkylated SWNTs in accordance with the present invention, wherein the aminoalkylated SWNTs are synthesized by a two-step procedure involving first the in situ preparation of the SWNT-(—($NLi_2$)$_x$ intermediate 6 by reaction of 1 with $Li_3N$ and then subsequent reaction of 6 with RCl (R=n-butyl, benzyl, H) reagents (Scheme 3).

Scheme 3

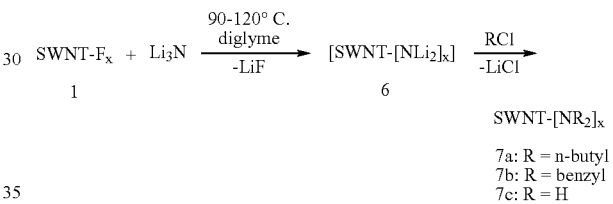

The fluoronanotubes were prepared by direct fluorination of purified HiPco-SWNTs [Nikolaev; Chiang II] at 150° C. to approximately $C_2F$ stoichiometry according to a procedure described elsewere [Chiang III; Gu]. In the typical two-step functionalization procedure 40-50 mg of 1 was added to the solution of approximately 20-30 mg $Li_3N$ in approx. 50-70 ml of dry diglyme and then refluxed at approx. 120° C. for approx. 12 hours under nitrogen. Thereafter, the reaction mixture was quenched by approx. 2 ml of either n-butyl chloride, benzyl chloride, or 10% HCl and stirred for 1 hour. The functionalized SWNTs 7a-c were isolated by filtration, and the material collected by the filtering membrane was washed with ethanol and water with subsequent drying in a vacuum oven.

FTIR, Raman, and UV-vis-NIR spectroscopies, SEM/EDAX, TEM, variable temperature-mass spectrometry (VTP-MS), and TGA analyses were used to confirm the sidewall attachment of the aminoalkyl functional groups.

Evidence for the significant alteration of the electronic state of 7 due to sidewall functionalization was obtained by Raman and UV-vis-NIR spectroscopy. In the Raman spectra, the typical purified HiPco-SWNTs breathing and tangential mode peaks at 200-263 and 1591 $cm^{-1}$ respectively, were observed to decrease in fluoronanotubes 1 and the peak at 1291 $cm^{-1}$ to increase dramatically—owing to the large presence (nearly 50%) of $sp^3$-hybridized carbons in the $C_2F$ composition structure of 1. The substantial relative intensity of the $sp^3$ carbon peak at 1291 $cm^{-1}$, observed in 7a-c (FIG. 1C) provides a diagnostic indication of disruption within the graphene π-bonded electronic structure of the sidewalls, suggesting their covalent functionalization. This was further confirmed by the solution-phase UV-vis-NIR spectra of nanotube-derivatives 7a-c which, as is typical for functionalized SWNTs [Bahr I; Bahr II; Bahr III; Khabashesku; Chiang III; and Gu], reveal a complete loss of the van Hove absorption band structures routinely observed in purified HiPco-SWNTs [Nikolaev; Chiang II].

The ATR-FTIR spectra allow the identification of aminoalkyl functionalities on the SWNTs. The two intense peaks at 1214 and 1102 cm$^{-1}$, characteristic of C—F bond stretches in fluoronanotubes 1, disappear after after Li$_3$N/RCl treatment as a result of fluorine displacement. The appearance of new peaks in the 2800-3000 cm$^{-1}$ regions, attributed to the N—H and C—H stretches, provide a strong indication of aminoalkyl group attachment to the sidewalls in 7a-c.

The elemental analyses of 7 by SEM/EDAX yielded, for all samples, significant nitrogen content (5-7 atomic %) as well as a very low (approximately 1 atomic %) fluorine content, verifying the efficient displacement of F by the amino functionalities. The thermal degradation studies have provided further evidence of covalent functionalization.

Example 4

Referring to Scheme 4, this example serves to better illustrate how funtionalized SWNTs of the present invention can be used to make "nylon-nanotube" polymer materials, wherein amino-functionalized SWNTs 3a have been reacted with adipyl chloride 4 (Scheme 4).

Scheme 4

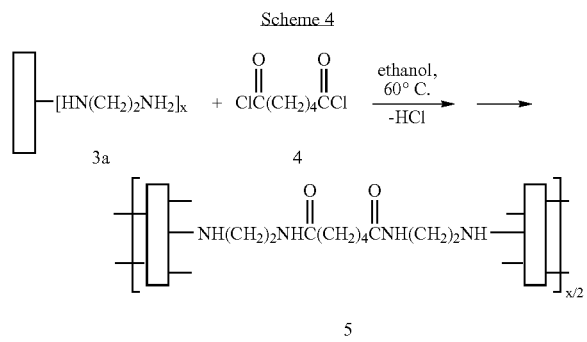

This reaction was carried out with 11.8 mg of 3a which, after sonication in 18 mL of ethanol and the addition of 2 mL of 4, was refluxed at 60° C. for 3 hours and stirred at room temperature for 24 hours. The resulting SWNT polymer derivative 5 was collected on a PTFE membrane after filtering the reaction mixture and washing the black material collected on the filter with chloroform. The formation of amide —C(=O)NH— linkages, as a result of the condensation reaction of 3a with 4, was established by observing in the IR spectrum of 5 (FIG. 6) the presence of medium-intensity bands at 3290, 1645, and 1340 cm$^{-1}$ due to N—H, C=O, and C—N stretches, which are typical for secondary amides [Lin-Vien et al., *The Handbook of Infrared and Raman Characteristic Frequencies of Organic Molecules*; Academic Press, Inc.: San Diego, Calif., 1991; p. 299]. The Raman spectrum of 5 showed a substantial decrease of the peak intensities of the SWNT breathing and tangential modes with respect to the intensity of the disordered sp$^3$ carbon mode at 1291 cm$^{-1}$. While not intending to be bound by theory, this is likely caused by the cross linking of the nanotube sidewalls via N-alkylidene diamido chains in the ladder polymer structure of 5. It seems reasonable to corelate the formation of this type of microstructure with the considerable modification, observed by SEM, of the morphology of nanotube materials from bundles, which is typical of sidewall-functionalized SWNTs (e.g., fluoronanotubes 1) (FIG. 7A), to the raft-like morphology of polymer 5 (FIG. 7B), which somewhat resembles the morphology of the wall-to-wall polymerized SWNTs recently produced under high-pressure/high-temperature conditions [Khabashesku, J. Phys. Chem. B, 106, 11155-11162, 2002].

These results suggest the possibility of using amino-functionalized SWNTs 3a-d and similar as reactive monomers in a broad range of polycondensation reactions leading to new polymer materials.

Although the present invention and its advantages have been described in detail, it should be understood that various changes, substitutions and alterations can be made herein without departing from the spirit and scope of the invention as defined by the appended claims.

What is claimed is:

1. A method for functionalizing single-wall carbon nanotubes comprising the steps of:
    a) fluorinating single-wall carbon nanotubes to form fluoronanotubes; and
    b) reacting the fluoronanotubes with a species comprising at least one amine functionality to provide single-wall carbon nanotubes functionalized through carbon-nitrogen covalent bonds to their sidewalls.

2. The method of claim 1, wherein the single-wall carbon nanotubes comprise diameters that range from about 0.5 nm to about 2.0 nm.

3. The method of claim 1, wherein the single-wall carbon nanotubes comprise lengths that range from about 10 nm to about 300 μm.

4. The method of claim 1, wherein the single-wall carbon nanotubes are selected from the group consisting of metallic, semiconducting, semimetallic, and combinations thereof.

5. The method of claim 1, wherein the step of fluorinating single-wall carbon nanotubes is a direct fluorination.

6. The method of claim 1, wherein the fluoronanotubes comprise a stoichiometry $CF_n$, where n ranges from about 0.1 to about 0.5.

7. The method of claim 1, wherein the species comprising at least one amine functionality comprises the general formula N(R)(R')R", where R, R', and R" are each selected from the group consisting of —H, alkyl, aryl, hydroxyalkyl, aminoalkyl, thioalkyl, and combinations thereof.

8. The method of claim 7, wherein R, R', and R" are all the same.

9. The method of claim 7, wherein R, R', and R" are not all the same.

10. The method of claim 1, wherein the step of reacting comprises the use of a catalyst selected from the group consisting of pyridine, triethylamine, and combinations thereof.

11. The method of claim 1, wherein the step of reacting comprises a reaction temperature that ranges from about 70° C. to about 170° C.

12. The method of claim 1, wherein the step of reacting comprises an inert atomosphere selected from the group consisting of nitrogen, argon, helium, and combinations thereof.

13. The method of claim 1, further comprising post-reaction processing steps selected from the group consisting of centrifugation, decanting, filtration, washing, drying, and combinations thereof.

14. The method of claim 1, wherein the species comprising at least one amine functionality is a diamine comprising the general formula $H_2N—(CH_2)_n—NH_2$, wherein n is an integer that ranges from 1 to about 20.

15. The method of claim 14, further comprising a step of reacting the single-wall carbon nanotubes functionalized through carbon-nitrogen covalent bonds to their sidewalls with a species capable of undergoing a polycondensation reaction.

16. The method of claim 14, further comprising a step of reacting the single-wall carbon nanotubes functionalized through carbon-nitrogen covalent bonds to their sidewalls with adipoyl chloride to form a nylon-nanotube polymer material.

17. A method for functionalizing single-wall carbon nanotubes comprising the steps of:
   a) fluorinating single-wall carbon nanotubes to form fluoronanotubes;
   b) reacting the fluoronanotubes with $Li_3N$ to form an intermediate species, $SWNT\text{-}[NLi_2]_x$; and
   c) reacting the intermediate species, $SWNT\text{-}[NLi_2]_x$, with a halide-containing species, R—X, to provide single-wall carbon nanotubes functionalized through carbon-nitrogen covalent bonds to their sidewalls.

18. The method of claim 17, wherein the single-wall carbon nanotubes comprise diameters that range from about 0.5 nm to about 2.0 nm.

19. The method of claim 17, wherein the single-wall carbon nanotubes comprise lengths that range from about 10 nm to about 300 μm.

20. The method of claim 17, wherein the single-wall carbon nanotubes are selected from the group consisting of metallic, semiconducting, semimetallic, and combinations thereof.

21. The method of claim 17, wherein the step of fluorinating single-wall carbon nanotubes is a direct fluorination.

22. The method of claim 17, wherein the fluoronanotubes comprise a stoichiometry $CF_n$, where n ranges from about 0.1 to about 0.5.

23. The method of claim 17, wherein the step of reacting the fluoronanotubes with $Li_3N$ comprises a first reaction temperature which ranges from about 90° C. to about 120° C.

24. The method of claim 17, wherein the step of reacting the fluoronanotubes with $Li_3N$ comprises a first reaction duration that ranges from about 2 hours to about 3 hours.

25. The method of claim 17, wherein the step of reacting the fluoronanotubes with $Li_3N$ comprises an inert atomosphere selected from the group consisting of nitrogen, argon, helium, and combinations thereof.

26. The method of claim 17, wherein the step of reacting the intermediate species, $SWNT\text{-}[NLi_2]_x$, with a halide-containing species, R—X, comprises an inert atmosphere selected from the group consisting of nitrogen, argon, helium, and combinations thereof.

27. The method of claim 17, wherein the step of reacting the intermediate species, $SWNT\text{-}[NLi_2]_x$, with a halide-containing species, R—X, comprises a second reaction temperature which ranges from about 25° C. to about 70° C.

28. The method of claim 17, wherein the step of reacting the intermediate species, $SWNT\text{-}[NLi_2]_x$, with a halide-containing species, R—X, comprises a second reaction duration that ranges from about 1 hour to about 2 hours.

29. The method of claim 17, further comprising post-reaction processing steps selected from the group consisting of centrifugation, decanting, filtration, washing, drying, and combinations thereof.

30. The method of claim 17, wherein the halide-containing species comprises the general formula R—X, where R is selected from the group consisting of —H, alkyl, aryl, substituted alkyl, substituted aryl, and combinations thereof, and X is selected from the group consisting of —F, —Cl, —Br, —I, and combinations thereof.

31. Functionalized single-wall carbon nanotubes, of the general formula $SWNT\text{-}[N(R)R']_x$, wherein substituent groups, $-[N(R)R']_x$, are bound to the single-wall carbon nanotubes through carbon-nitrogen covalent bonds to their sidewalls.

32. The functionalized single-wall carbon nanotubes of claim 31, wherein R and R' are each selected from the group consisting of —H, alkyl, aryl, substituted alkyl, substituted aryl, alkoxy, hydroxyalkyl, and combinations thereof.

33. The functionalized single-wall carbon nanotubes of claim 31, wherein R is —H.

34. The functionalized single-wall carbon nanotubes of claim 31, wherein the number of substituent groups per nanotube carbon ranges from about 0.01 to about 0.25.

35. The functionalized single-wall carbon nanotubes of claim 31, wherein said functionalized single-wall carbon nanotubes possess superior solubility in solvents selected from the group consisting of primary amines, alcohols, water, dilute acids, and combinations thereof, relative to non-functionalized single-wall carbon nanotubes.

36. The functionalized single-wall carbon nanotubes of claim 31 used as precursors for chemical reactions.

37. The functionalized single-wall carbon nanotubes of claim 36, wherein the functionalized single-wall carbon nanotubes have been reacted with adipoyl chloride so as to form a nylon-nanotube material comprising the functionalized single-wall carbon nanotubes.

* * * * *

UNITED STATES PATENT AND TRADEMARK OFFICE
CERTIFICATE OF CORRECTION

| | | |
|---|---|---|
| PATENT NO. | : 7,452,519 B2 | Page 1 of 1 |
| APPLICATION NO. | : 10/714187 | |
| DATED | : November 18, 2008 | |
| INVENTOR(S) | : Valery N. Khabashesku et al. | |

It is certified that error appears in the above-identified patent and that said Letters Patent is hereby corrected as shown below:

Column 1, between lines 10 and 11: add "STATEMENT REGARDING FEDERALLY SPONSORED RESEARCH"

Column 1, lines 11-15: replace [This invention was made with support from the Robert A. Welch Foundation, Grant No. C-0109, The Texas Higher Education Coordinating Board's Advanced Technology Program, Grant No. 003604-0026-2001, and the National Aeronautics and Space Administration, Grant No. NAGW-2845] with "This invention was made with government support under Grant No. NCC9-77, awarded by the National Aeronautics and Space Administration. The Government has certain rights in the invention."

Signed and Sealed this
Seventh Day of June, 2011

David J. Kappos
*Director of the United States Patent and Trademark Office*